United States Patent
Hoferer

[15] 3,653,366
[45] Apr. 4, 1972

[54] CONTROL DEVICE FOR THE AIR-INTAKE OF CARBURETOR-TYPE INTERNAL COMBUSTION ENGINES

[72] Inventor: Richard Hoferer, Bissinger, Germany

[73] Assignee: Filterwerk Mann & Hummel GmbH, Ludwigsburg, Germany

[22] Filed: Mar. 23, 1970

[21] Appl. No.: 21,876

[30] Foreign Application Priority Data

Apr. 2, 1969 Germany..................P 19 16 864.0

[52] U.S. Cl.................................123/122 D, 123/122 H
[51] Int. Cl..........................................F02m 35/04
[58] Field of Search.......................123/122, 122 D, 122 H

[56] References Cited

UNITED STATES PATENTS

| | | | |
|---|---|---|---|
| 1,931,039 | 10/1933 | Steensen | 123/122 D |
| 2,058,204 | 10/1936 | Ball et al. | 123/122 H |
| 2,396,317 | 3/1946 | Cutts | 123/122 D |
| 2,781,032 | 2/1957 | Sebok et al. | 123/122 D |
| 2,839,039 | 6/1958 | Obermaier | 123/122 H |
| 3,208,441 | 9/1965 | Ottofy | 123/122 D |
| 3,450,119 | 6/1969 | Sendelbach | 123/122 |

FOREIGN PATENTS OR APPLICATIONS 766,303  1/1957  Great Britain.....................123/122 D Primary Examiner—Al Lawrence Smith
Attorney—Otto John Munz

[57] ABSTRACT

An air intake control device admitting preheated and/or cold air to the carburetor in response to changes in the air temperature, the device having a thermostat-controlled control flap pivoting between the intake openings of a cold-air duct and a warm-air duct, closing off the one or the other in its end positions. The control linkage includes a telescopically compressible push linkage with an overload spring and a pushinsensitive pull member pulled by the overload spring in its retracting node and connected to the control flap shaft at a greater pivot arm than that of the push linkage, so that the overload spring serves also as the return spring for the control flap. The control members are mounted on a removable frame inside the main intake duct.

7 Claims, 6 Drawing Figures

3,653,366

PATENTED APR 4 1972

Inventor
RICHARD HOFERER
BY *Otto John Munz*
ATTORNEY

Inventor
RICHARD HOFERER
BY *Otto John Munz*
ATTORNEY

CONTROL DEVICE FOR THE AIR-INTAKE OF CARBURETOR-TYPE INTERNAL COMBUSTION ENGINES

BACKGROUND OF THE INVENTION

1. Field of the Invention

The invention relates to control devices for the air intake of carburetor-type internal combustion engines, and in particular to control devices admitting pre-heated and/or cold air to the carburetor in response to changes in the air temperature.

2. Description of the Prior Art

The carburetors of internal combustion engines operate optimally when the air taken in through the filter and carburetor has a predetermined temperature. It is therefore desirable to maintain the intake air temperature at a constant level during the operation of an internal combustion engine, so that the composition of the air-fuel mixture fed to the engine does not change. It has been found that relatively warmer air, because of its greater volume, will become more enriched with fuel relative to the weight of air, while colder air will carry less fuel per unit of air weight. Added to this disadvantage is the danger that the carburetor may develop icing, when the intake air reaches a temperature near the freezing point.

In the German Utility Model (Gebrauchs-Muster) No. 1,998,753 is shown an air intake control device and air intake filter where the return motion of the control flap is produced by a special return spring which is arranged concentrically around the guide sleeve holding the overload spring, one end of the return spring resting against the housing, while the other end engages a shoulder on the control linkage. This arrangement has the advantage of avoiding the creation of additional frictional load on the control flap pivot and on the pivot joint between the control rod and the pivot arm. However, it also has the disadvantage of necessitating a comparatively large radius on the pivot arm and hence large displacements of the thermostat control pin to move the control flap between its two end positions, in order to minimize the effect of the unavoidable clearances in the control flap pivot and in the pivot joint between the control rod and the pivot arm. The thermostat requires more time to produce the larger displacements of the control pin and the control response obtained is therefore slower, in spite of the reduction in pivot friction.

In the U.S. Pat No. 2,839,039 is described a thermostatically controlled carburetor air intake showing a control device for the intake of pre-heated air and/or cold air which includes an overload spring for the control motion and a tension spring for the return motion, the latter being attached at one end to the housing and at the other end directly to the control flap. The tension spring thereby maintains all movable parts of the control device under pre-loaded contact, so that position errors of the control flap due to clearances in the pivots are avoided, even when the radius of the pivot arm is comparatively small.

SUMMARY OF THE INVENTION

It is the purpose of the invention to provide an improved air intake control device with simplified design and adjustment features. This objective is attained by providing at the control flap a return pivot arm to which is attached a return member which engages the control rod in a retracting mode in the pulling sense while being free to move in the pushing sense, when to drive means of the thermostat moves forward the return pivot arm having a radius which is greater than that of the control flap pivot arm.

This arrangement makes possible a control linkage having only one spring, the latter serving simultaneously as an overload spring and as a return spring. Only the manufacturing tolerances of this one spring need to be considered in the adjustment of the linkage and both the assembly and the adjustment of the control device are accordingly simplified.

As a return member may be used, for example, a flexible pull strap or cable which links the return pivot arm to the control rod. In a preferred embodiment the return link is arranged as a rigid pull rod whose end away from the return pivot arm is guided on the control rod for longitudinal sliding motion thereon, engaging a shoulder on the control rod in the pulling sense and moving away from the shoulder under overload conditions. The pull rod is easily manufactured in the form of a metal stamping, easy to slide over the return pivot arm, and simple to assemble to the control rod on which it is slidably guided.

A preferred embodiment further suggests the arrangement of the control flap pivot arm and return pivot arm between the two trunnions of the control flap shaft, whereby at least one of the pivot connections is an open connection, the opening being on the side opposite to the overload spring and so arranged that the control linkage can be connected to the pivot arm by laterally sliding it onto the pivot bearing. This makes it possible to permanently attach the control flap to its shaft before final assembly and to insert it into the pivot bores. This arrangement obviates the need for either a split design of the main intake duct, whereby the separation plane coincides with the pivot bores, or the provision of a closable access opening in the wall of the intake duct through which the control flap is to be inserted.

BRIEF DESCRIPTION OF THE DRAWINGS

In the accompanying drawings is illustrated, by way of an example, an embodiment of the invention, represented in the various figures as follows.

DESCRIPTION OF THE PREFERRED EMBODIMENT

Figure 1:
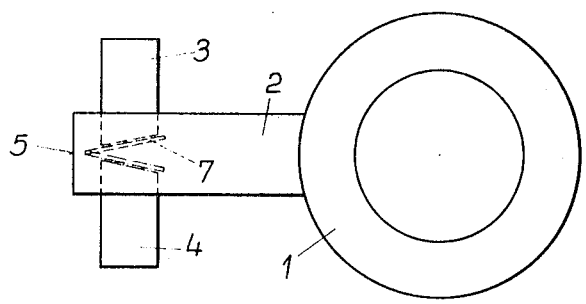
FIG. 1 shows, in a schematic manner, a plan view of an air intake control device and air filter embodying the invention.
Figure 2:
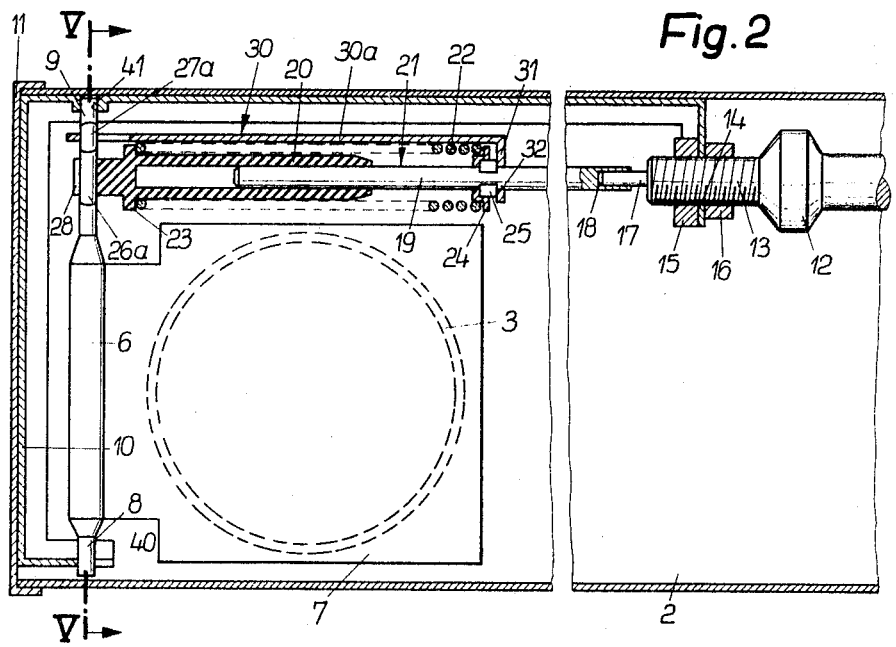
FIG. 2 shows, in a cross-sectional view along the line II — II of FIG. 5, the details of the air intake control device of the invention.
Figure 3:
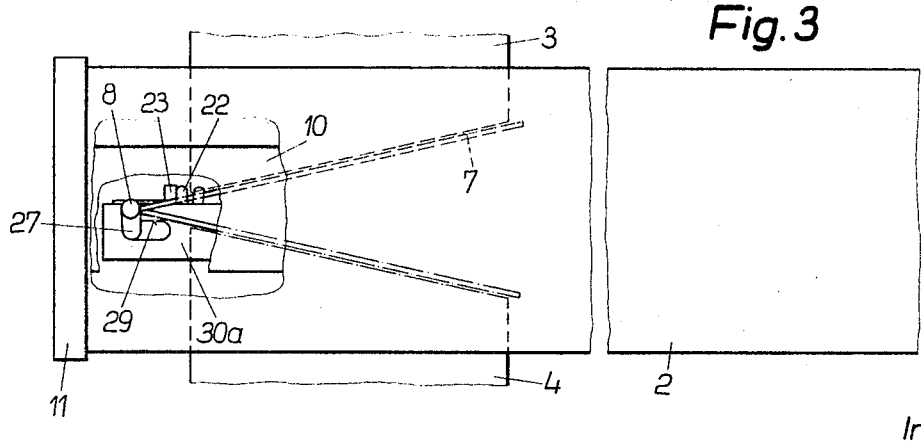
FIG. 3 represents a plan view of the embodiment shown in FIG. 2.

As can be seen in FIG. 1, the air intake for a carburetor-type internal combustion engine consists of an air filter 1 and a main intake duct 2 into which is opening from the one side a cold-air intake 3 and from the opposite side a warm-air intake 4. To the warm-air intake is connected a warm-air duct (not shown in the drawing) whose open end is arranged in the vicinity of the engine exhaust manifold so as to take in air which has been pre-heated through contact with the hot exhaust manifold. The main intake duct 2 is closed off at its distant end 5.

The details of the preferred embodiment are illustrated in FIGS. 2 through 5 as follows:

In order to control the respective amounts of pre-heated and cold air admitted to the main intake duct 2, a control flap 7 is pivotably mounted on a shaft 6. The trunnions 8 and 9 of the shaft 6 are guided in a frame 10, the latter being attached by spot weldments to a cover 11 closing off the distant end 5 of the main intake duct 2. The cover 11 and attached frame 10 can be removed from the main intake duct for purposes of cleaning or for repairs and adjustments to the intake control device. The cover 11 is fastened to the main intake duct 2 by means of conventional fasteners (not shown).

The position of the control flap 7 is determined by an expansion-thermostat 12, the latter having a threaded portion 13 by which it engages a bore 14 of the frame 10, its longitudinal position being adjustable by means of two nuts 15 and 16. The thermostat 12 has a drive pin 17 which engages a bore 18 in a control rod 19, the latter in turn slidably engaging the bore of a control sleeve 20 so as to form a push rod assembly 21. Between the control rod 19 and the control sleeve 20 is arranged an overload spring 22 allowing for telescopic shortening of the push rod assembly 21 against the force of the overload spring. The overload spring 22, is retained between an annular shoulder 23 on the control sleeve 20 and a cap washer 24 abutting against a swaged shoulder 25 on the control rod 19.

Figure 6:
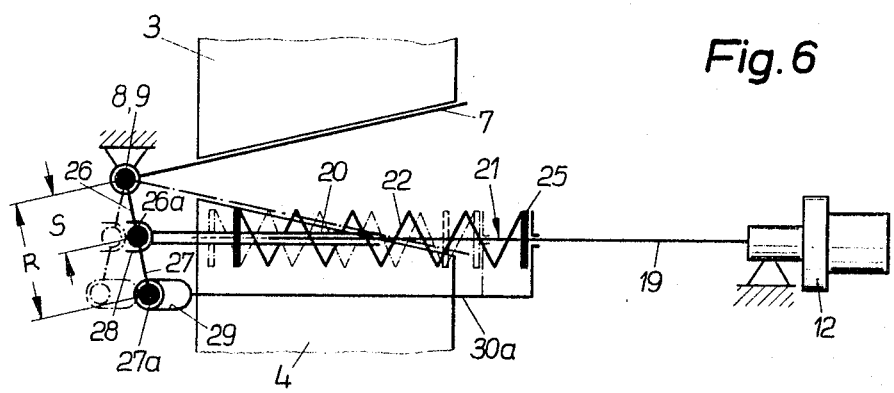
FIG. 6 shows, in a schematic representation, the linkage and displacements of the control device of the invention.

The control sleeve 20 has a fork-type pivot bearing at its forward end 28 (as indicated in FIG. 6) engaging therewith the crankpin 26a of the pivot arm 26 on the control flap shaft 6, the latter including the pivot arm in the form of a crankshaft.

In addition to the control flap pivot arm 26, the shaft 6 also includes a crankshaft-type return pivot arm 27. At the crankpin 27a of the return pivot arm 27 engages a pull member 30 having the form of a pull rod 30a. At its forward end the pull rod 30a has an oblong hole 29 engaging the crankpin 27a and at the opposite end 31 it has an axial bore 32 by which it engages the control rod 19 so as to be guided thereon allowing longitudinal sliding motion of the pull rod 30a relative to the control rod 19. This motion is limited in the pulling sense by the shoulder 25 of the control rod 19. The radius R of the return pivot arm is larger than the radius S of the control flap pivot arm 26 (see FIG. 6).

Figure 4:
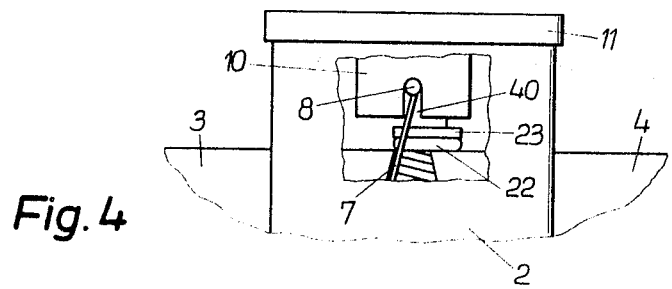
FIG. 4 represents a partial bottom-plan view of the embodiment shown in FIGS. 2 and 5.
Figure 5:
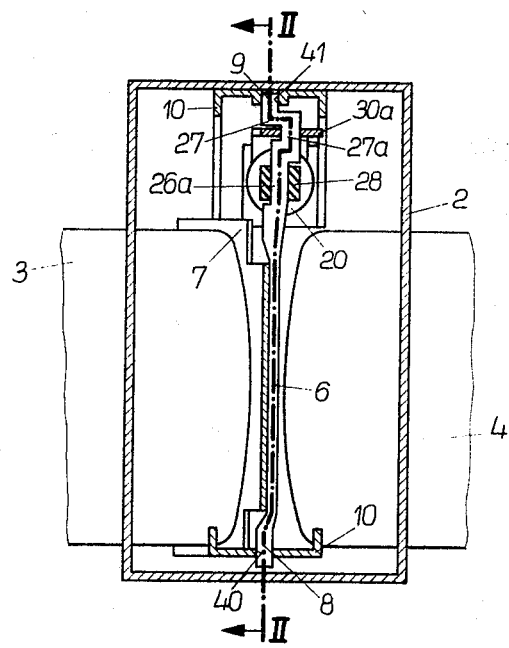
FIG. 5 represents a cross-sectional view along the lines V — V of FIG. 2.

The trunnions 8 and 9 of the control flap shaft 6 are pivotably guided in the pivot bores 40 and 41. The pivot bore 41 is formed from the frame 10 by a collar-punching operation. As shown in FIG. 4, the pivot bore 42 is provided with a lateral opening opposite to the bearing contact under the pressure of the overload spring 22, allowing for the easy insertion of the trunnion 8 during assembly.

The operation of the control device is more easily understood from the schematic representation given in FIG. 6, where the corresponding structural elements are designated with the respective reference numerals. When the internal combustion engine is set of operation, and as long as the temperature of the air taken in is low, the control flap is maintained against the cold-air intake 3 by spring 30 closing off its opening completely, while fully opening up the warm-air intake 4. As the exhaust manifold of the engine heats up, progressively warmer air is taken in through the warm-air intake 4 into the main intake duct 2 and past the expansion thermostat 12 until the latter responds by moving the control rod 19 of the push rod assembly 21 in the direction of crank pin 26a. The forward displacement of the shoulder 25 on the control rod 19 allows a corresponding forward motion by the pull rod 30a which is linked to the crankpin 27a of the return pivot arm 27, so that the control flap 7 is free to make a corresponding pivoting motion away from the cold-air intake opening 3. The movement for this pivoting motion is produced by the pre-loaded overload spring 22 bearing against the control sleeve 20 and the crankpin 26a of the pivot arm 26 of the control flap. Eventually, the movable control elements assume the opposite end position indicated by dotted lines in the FIGS. 1, 3, and 6. In this position the warm-air intake 4 is completely closed off by the control flap 7 and the cold-air intake is fully open, while the overload spring 22 is compressed to a smaller length. Should it now happen, as for example under full-load operation, that the exhaust manifold and with it the air taken in heat up still further, then the thermostat will produce an over-travel of the control rod 19, which over-travel will be accomodated by the overload spring 22. In this case the control rod 19 and shoulder 25 may move, for example, to a third position shown by dotted lines in FIG. 6, where the shoulder 25 has moved away from the pull rod 30a.

When the temperature of the air taken in drops, the thermostat 12 retracts, allowing the overload spring 22 to expand by pushing back the control rod 19 until the shoulder 25 engages again the pull rod 30a. A further drop in the temperature will cause the control flap 7 to be pivoted back toward the cold-air intake 3 through the action of the pull rod 30a engaging the return pivot arm 27. In the opposite end position, the cold-air intake 3 is closed off again and the warm-air intake 4 is fully opened.

I claim:

1. A control device for the air intake of a carburetor-type internal combustion engine comprising in combination:
   a. a main intake duct;
   b. a cold-air intake duct opening into the main intake duct from one side;
   c. a warm-air intake duct opening into the main intake duct from another side so as to face the cold-air intake duct;
   d. a control flap with a shaft pivotably mounted between the openings of the cold-air and warm-air intake ducts, so that it can pivot between a first end position in which it closes off the opening of the cold-air intake duct and a second end position in which it closes off the warm-air intake duct;
   e. a thermostat and drive means with a control sleeve on said drive means, mounted inside the main intake duct and means to actuate said drive means by said thermostat to produce a control displacement of its drive means in response to the temperature of the air passing through the main duct; and
   f. a control linkage arranged between the control flap and the thermostat drive means so as to give the control flap a pre-determined angular position in response to the intake temperature, this control linkage further including a push rod assembly pushed by the thermostat in response to the intake temperature with a pre-loaded overload spring, a control flap pivot arm on said shaft, and a control rod on the thermostat side linking the thermostat drive means to the control flap over said control flap pivot arm shaft over on said shaft, and
   a push-insensitive pull member pulled by said overload spring in its retracting mode and linking the control rod to a return pivot arm on the said control flap shaft, the radius of said return pivot arm being larger than the radius of said control flap pivot arm, whereby the effective leverage of the said pull member on the control flap shaft is greater than that of the push rod assembly.

2. The device as defined in claim 1, said control rod having a sliding connection between said drive means and said control sleeve wherein
   the connection between the thermostat drive means and the control rod is pull-insensitive, acting on the said control-flap arm in a clockwise direction only, and wherein
   the total possible displacement of the thermostat drive means exceeds the corresponding pivoting displacement of the control flap, overtravel in one direction being permitted by the pull-insensitive connection and overtravel in the other direction being permitted by the overload spring.

3. The device as defined in claim 1, wherein
   the push rod assembly includes a control sleeve with a guide bore to accomodate a variable length portion of the control rod and a shoulder to retain one end of the overload spring, the control rod having a shoulder to retain the other end of the overload spring, the latter surrounding respective portions of the control sleeve and control rod; and wherein
   the pull member is a rod-type rigid link, at least one of its end connections being arranged for slidable motion away from a pull position, when the push rod assembly is longitudinally compressed against the overload spring.

4. The device as defined in claim 3, wherein
   the pull member is connected to the control rod at a point between the thermostat and the control rod shoulder engaging the latter for retracting movement therewith, the pull member having an axial bore for slidable motion on the control rod away from said shoulder, when the push rod assembly is longitudinally compressed against the overload spring.

5. The device as defined in claim 1, wherein
   the main intake duct further includes a removable support frame forming the duct portion to which the thermostat is mounted and having pivot support means for the control flap shaft, so that the control flap, control linkage and thermostat can be removed from the duct as one sub-assembly.

6. The device as defined in claim 5, wherein the support frame includes opposing pivot bores to accomodate the two ends of the control flap shaft, at least one of the pivot bores being laterally open for insertion of the shaft.

7. The device as defined in claim 1, wherein the control flap shaft includes the control flap pivot arm and the return pivot arm as integral crank-shaped portions extending in the same direction therefrom, the control sleeve having a laterally open bore for its connection to the control flap pivot arm, and the pull member having an oblong hole for insertion over the return pivot arm.

* * * * *